United States Patent [19]

Mowat

[11] 4,198,345
[45] Apr. 15, 1980

[54] PROCESS FOR THE PRODUCTION OF BIS-AZOMETHINE PIGMENTS

[75] Inventor: Douglas Mowat, Glasgow, Scotland

[73] Assignee: Ciba-Geigy Corporation, Ardsley, N.Y.

[21] Appl. No.: 908,182

[22] Filed: May 22, 1978

[30] Foreign Application Priority Data

May 31, 1977 [GB] United Kingdom ............... 22899/77

[51] Int. Cl.² ............................................. C07F 15/04
[52] U.S. Cl. .............................. 260/439 R; 260/429 C
[58] Field of Search ........................ 260/429 C, 439 R

[56] References Cited

U.S. PATENT DOCUMENTS

| | | | |
|---|---|---|---|
| 2,993,065 | 7/1961 | Kumins et al. ................... | 260/439 R |
| 3,687,991 | 8/1972 | Gaeng et al. .................... | 260/429 C |
| 3,864,371 | 2/1975 | Inman et al. ................... | 260/429 C X |
| 3,875,200 | 4/1975 | L'Eplattenier et al. ...... | 260/429 C X |
| 3,895,041 | 7/1975 | Inman et al. ................... | 260/439 R X |
| 3,903,118 | 9/1975 | Dhaliwal ....................... | 260/429 C X |
| 4,042,611 | 8/1977 | Papenfuhs et al. ........... | 260/429 C X |
| 4,044,036 | 8/1977 | Hari et al. .................... | 260/429 C X |
| 4,097,510 | 6/1978 | Papenfuhs et al. ........... | 260/429 C X |
| 4,113,759 | 9/1978 | Papenfuhs et al. ........... | 260/429 C X |

*Primary Examiner*—Helen M. S. Sneed
*Attorney, Agent, or Firm*—Joseph F. DiPrima

[57] ABSTRACT

A process for the production of a bis-azomethine pigment having the formula

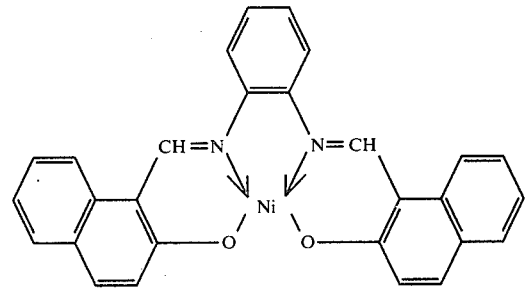

in the pigmentary form in which it has an orange red color and, under the conditions defined by the C.I.E. system of color measurements, has an x chromaticity coordinate of from 0.59 to 0.63 and a y chromaticity coordinate of from 0.33 to 0.36, which process comprises:

(a) forming a suspension of 2-hydroxy-1-naphthaldehyde in an alkaline medium in the presence of an antioxidant, (b) reacting this suspension with the stoichiometric proportion of o-phenylene diamine required to form the compound having the formula

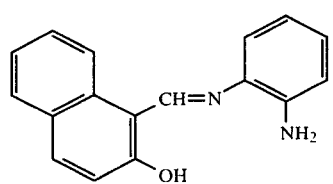

II (c) metallizing the compound of formula II with a solution of a nickel salt (d) reacting the metallized compound of formula II with the stoichiometric proportion of 2-hydroxy-1-naphthaldehyde required to form the compound of formula I and (e) isolating the compound of formula I.

16 Claims, No Drawings

PROCESS FOR THE PRODUCTION OF BIS-AZOMETHINE PIGMENTS

The present invention relates to a chemical process, in particular to a new process for the production of a bisazomethine pigment.

In British patent specification No. 1413512, there is described a compound having the formula:

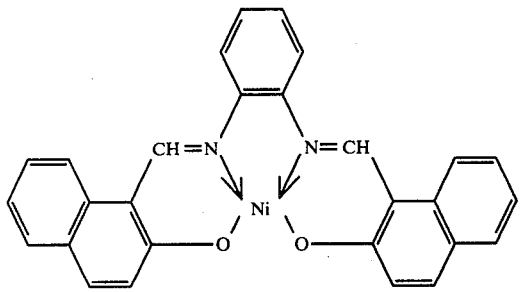

I in the pigmentary form in which it has an orange-red colour and, under the conditions defined by the C.I.E. system of colour measurement, has an x chromaticity co-ordinate of from 0.59 to 0.63 and a y chromaticity co-ordinate of from 0.33 to 0.36.

This reference also describes two processes of producing this pigmentary form of Compound I.

We have now found a new process for producing the pigmentary form (defined in British specification No. 1413512) of the compound of formula I. This process involves the in situ production of the compound of formula II, the use of an antioxidant, a metallisation stage in the presence of the antioxidant and a subsequent condensation with 2-hydroxy-1-naphthaldehyde resulting in a product having a brighter and yellower shade and increased transparency and improved flip properties relative to products of the previously-known processes.

Accordingly, the present invention provides a process for the production of a compound having the formula:

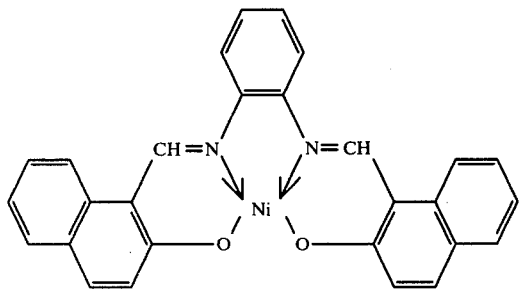

I in the pigmentary form in which it has an orange red colour and, under the conditions defined by the C.I.E. system of colour measurements, has an x chromaticity co-ordinate of from 0.59 to 0.63 and a y chromaticity co-ordinate of from 0.33 to 0.36, which process comprises:

(a) forming a suspension of 2-hydroxy-1-naphthaldehyde in an alkaline medium in the presence of an antioxidant, (b) reacting this suspension with the stoichiometric proportion of o-phenylene diamine required to form the compound having the formula:

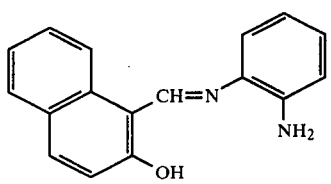

II (c) metallising the compound of formula II with a solution of a nickel salt (d) reacting the metallised compound of formula II with the stoichiometric proportion of 2-hydroxy-1-naphthaldehyde required to form the compound of formula I and (e) isolating the compound of formula I.

In the process of the present invention, an antioxidant is added in step (a) of the reaction and remains in the reaction mixture throughout the entire reaction sequence. By this technique, the decomposition of the aldehyde and/or its alkali metal salt in steps (a) and (d) is inhibited and the o-phenylene diamine in step (b) is likewise stabilised against oxidation. Antioxidants may be used which do not interfere with the reaction sequence and include metal dithionites e.g. sodium dithionite, alkali metal sulphites e.g. sodium sulphite, sulphurous acid and, especially, alkali metal metabisulphites e.g. sodium metabisulphite. The use of a metabisulphite antioxidant is advantageous in that, for instance, it probably acts as a solubilising agent for the aldehyde reactant used in the process of the present invention.

It is surprising that the metallisation step of the process of the invention proceeds well without the need to remove the antioxidant previously added to the reaction mixture. It would have been expected that the antioxidant could have reduced the metallising agent and thereby have impaired its function.

The proportion of antioxidant added in step (a) is dependent on the nature of the compound used and may be up to 200% by weight compared to the 2-hydroxy-1-naphthaldehyde. While amounts of antioxidant in excess of 200% may be used, no advantage is gained by using such greater amounts.

An important aspect of the process of the invention is the control of the pH value of the reaction mixtures, an alkaline pH value being required in each reaction step.

The pH value in any stage is dependant upon the rate of the reaction. In step (a) the initial pH value after the addition of the alkali is in the range 8.0 to 12.5 and this reaction is desirably effected at a temperature in the range 20° to 25° C. In step (b), the ortho-phenylenediamine may be added as a dry powder, aqueous slurry or solution, or solution in acid e.g. acetic acid. The reaction is carried out at a pH value preferably in the range 8.0 to 12.5 and the temperature is advantageously allowed to rise to 40° to 100° C., preferably to 50° to 75° C.

The metallisation step (c) is effected with advantage at a pH value within the range quoted for step (b) and after the addition of all the metallising agent, the pH is within the range 7.5 to 10.0. The metallisation step (c) takes place at a temperature up to 100° C., preferably in the range 50° to 75° C. and in order to ensure completion of the metallisation, the final reaction mixture of step (c) is desirably held at 70°–100° C. for up to 2 hours, no advantage being gained by holding the reaction mixture at elevated temperature beyond 2 hours.

In condensation step (d), the aldehyde may be added as a powder or an aqueous slurry. The condensation is advantageously effected at an elevated temperature, preferably at 95°–100° C., and the reaction mixture is desirably held at this temperature until the pH value of the mixture drops to within the range 6.0 to 7.0.

A further important aspect of the process of the invention is the preferred presence of ammonium ions during the metallisation step (c). Since the metallisation step (c) is effected under alkaline conditions, many simple nickel salts cannot be used effectively as metallisation agents because they are only slightly soluble in the reaction mixture. However, by forming an ammonium complex of simple nickel salts, either previously or in situ in the reaction mixture, this solubility problem is overcome. Furthermore, pigments of formula I having the yellowest shades are obtained by effecting the process of the invention in the presence of ammonia. Consequently, preferred nickel salts for use in step (c) are nickel ammonium complexes of inorganic or organic acids e.g. nickel hexammonium nitrate, nickel hexammonium chloride and nickel hexammonium acetate.

The process of the present invention is normally carried out with mechanical stirring, preferably using vigorous agitation or high speed stirring such as can be achieved by a Silverson Mixer capable of 6,000 r.p.m., and advantageously in the presence of a surface-active agent which does not interfere with the reaction sequence, which may be anionic, cationic or non-ionic in character; non-ionic surfactants being preferred as they do not interfere with the pH control of the reaction mixture.

Typical non-ionic surfactants include those falling within the following sub-groups:
(a) monoethers of polyglycols with long-chain fatty alcohols; for instances, the condensation product of from 5 to 20 moles of ethylene oxide with a C16–C18 fatty alcohol e.g. cetyl alcohol;
(b) monoesters of polyglycols with long-chain fatty acids; for instance, the condensation products of 5 to 20 moles of ethylene oxide with a fatty acid having 12 to 18 carbon atoms, for example lauric acid or stearic acid. Specific examples are polyoxyethylene sobitan oleate or -laurate and polyethoxylated monolaurate;
(c) monoethers of polyglycols with alkyl-phenols; for instance the reaction production of from 5 to 20 moles of ethylene oxide with a C6–12 alkyl phenol, e.g. nonyl phenol;
(d) N,N-polyethoxylated long-chain fatty amines; for instance the reaction production of from 5 to 50 moles of ethylene oxide with a C12–C18 fatty amine e.g. cocamine and tallow amine;

Typical cationic surface-active agents include quaternary ammonium compounds derived from primary amines.

The anionic surfactants may be alkali metal or ammonium salts of fatty carboxylates, sulphates or sulphonates. Examples are alkali metal stearates, alkali metal alkyl sulphates e.g. sodium dodecyl sulphate, alkali metal alkyl sulphonates e.g. potassium dodecyl sulphonate, alkali metal alkaryl sulphonates e.g. sodium dodecyl benzene sulphonate, fatty acid sarcosinates, sulphonated alkyl esters of long chain fatty acids and alkyl sulphosuccinates.

The compounds of formula I may be employed as pigments directly after their production according to the process of this invention i.e. after their isolation in step (e), e.g. after being filtered off and dried. Alternatively, they may be first further processed using known wet or dry conditioning techniques such as grinding—either alone or in the presence of a water-soluble salt or other medium which can subsequently be removed e.g. by washing.

The compound of formula I produced in the process of the present invention is valuable for use as a pigment for the colouration of high molecular organic materials, for example natural or synthetic polymers or copolymers such as vinyl chloride polymers and copolymers; polyolefins e.g. polyethylene, polypropylene and polyacrylonitrile; polystyrene and styrene copolymers; and natural and synthetic rubbers—each in the form of films or bulk material. Of particular interest, however, are surface coating media such as paints, inks and lacquers.

The pigments produced according to the process of the invention have an attractive orange-red shade, high colouring power and transparency, especially in automotive paint lacquers.

The following Examples further illustrate the present invention.

EXAMPLE 1

75 grams of a condensate of nonyl phenol and ethylene oxide, 5.0 Kg of sodium metabisulphite and 5.45 Kg of 2-hydroxy-1-naphthaldehyde are charged into 200 liters of cold water and the slurry so obtained is agitated by means of a high speed mixer for 5 minutes.

A solution of 2.5 Kg of sodium hydroxide dissolved in 25 liters of cold water is added and the total mixture is stirred at 20° to 25° C. for a further 15 minutes after completion of the addition.

To this mixture, there is then added a well-dispersed slurry of 3.425 Kg. of o-phenylenediamine in 50 liters of cold water containing 10 g of a condensate of nonyl phenol and ethylene oxide. Agitation of the slurry is continued at 20° to 25° C. for a further 15 minutes after completion of the addition and the mixture is then heated to 70° C. using internal steam heating.

Heating is continued until the temperature of the mixture reaches 90° C., the mixture held at 90° C. for 30 minutes and then there is added, over a period of 15 minutes, a solution of 10.2 Kg of nickel nitrate hexahydrate dissolved in a minimum amount of water containing 13.3 Kg of 33% ammonia solution (s.g. 0.88).

The whole mixture is then heated to 95° C. and an aqueous slurry containing 5.5. Kg of 2-hydroxy-1-naphthaldehyde is added. The temperature of the slurry is held at 95°–100° C. for at least 4 hours after which the pH value of the slurry was 6.5. The slurry is then filtered and the filter-cake washed with hot water until free of nickel and sulphite ion and dried at 50°–55° C.

EXAMPLE 2

0.15 Grams of a condensate of cetyl/oleyl alcohol and ethylene oxide, 10 grams of sodium metabisulphite and 10.9 grams of 2-hydroxy-1-naphthaldehyde are charged into 600 mls cold water and the resultant slurry stirred by a high speed mixer for 15 minutes.

A solution of 4.5 grams sodium hydroxide dissolved in 100 mls cold water is added and the total mixture stirred at 20°–25° C. for a further 15 minutes.

To this mixture, there is then added a well-dispersed slurry of 6.78 gms of o-phenylenediamine in 100 mls cold water containing 0.075 gms of a condensate of cetyl/oleyl alcohol and ethylene oxide.

The slurry is stirred at 20°-25° C. for a further 15 minutes after completion of the addition, and then heated to 70° C. using internal steam heating, at which stage a solution of 20.4 gms of nickel nitrate hexahydrate dissolved in 125 mls water containing 26.6 gms 33% ammonia solution (S.G. 0.88) is added over a period of 5 minutes.

Heating of the mixture is continued until the temperature reaches 98° C. The mixture is held at 95°-100° C. for 30 minutes and then there are added 11 grams 2-hydroxy-1-naphthaldehyde dry powder over 1-2 minutes. The temperature of the slurry is maintained at 98°-100° C. for 4 hours at which point the pH value is between 6 and 7. The slurry is then filtered and the filter-cake washed with hot water until free of nickel and sulphite ion, and dried at 50°-55° C.

EXAMPLE 3

The procedure of Example 2 is followed except that the surface active agent described is replaced by polyethylene glycol monolaurate and similar results were obtained.

EXAMPLE 4

The procedure of Example 3 is followed except that replacement is by a condensate of cocoamine and ethylene oxide and similar results were obtained.

EXAMPLE 5

The procedure of Example 3 is followed except that replacement is by hexadecyl trimethyl ammonium chloride and similar results were obtained.

EXAMPLE 6

The procedure of Example 3 is followed except that replacement is by sodium lauryl sarcosinate and similar results were obtained.

EXAMPLE 7

The procedure of Example 3 is followed except that replacement is by sodium dioctyl sulphosuccinate and similar results were obtained.

EXAMPLE 8

0.15 Grams of a condensate of nonyl phenol and ethylene oxide, 40 grams sodium metabisulphite, and 10.9 grams of 2-hydroxy-1-naphthaldehyde are charged into 600 mls cold water and the resultant slurry stirred by a high speed mixer for 15 minutes.

A solution of 4.5 grams sodium hydroxide dissolved in 100 mls cold water is added and the total mixture stirred at 20°-25° C. for a further 15 minutes.

To this mixture, there is then added a well-dispersed slurry of 6.78 grams o-phenylenediamine in 100 mls cold water containing 0.075 grams of a condensate of nonyl phenol and ethylene oxide. The slurry is stirred at 20°-25° C. for a further 15 minutes after completion of the addition, and then heated to 70° C. using internal steam heating, at which stage a solution of 20.4 grams of nickel nitrate hexahydrate dissolved in 125 mls water containing 26.6 grams 33% ammonia solution (S.G. 0.88) is added over a period of 1-2 minutes.

Heating of the mixture is continued until the temperature reaches 98° C. The mixture is held at 95°-100° C. for 30 minutes and then 11 grams 2-hydroxy-1-naphthaldehyde as a dry powder are added over 1-2 minutes. The temperature of the slurry is maintained at 98°-100° C. for 4 hours at which point the pH value is between 6 and 7. The slurry is then filtered and the filter cake washed with hot water until free of nickel and sulphite ion, and dried at 50°-55° C.

EXAMPLE 9

The procecure of Example 8 is followed except that the amount of sodium metabisulphite is increased to 100 grams i.e. 457% compared to the 2-hydroxy-1-naphthaldehyde weights.

EXAMPLE 10

The procedure of Example 8 is followed except that 19 grams of sodium dithionite are used in place of 40 grams sodium metabisulphite and similar results were obtained.

EXAMPLE 11

The procedure of Example 8 is followed except that 26.6 grams sodium hypophosphite are used in place of 40 grams sodium metabisulphite and similar results were obtained.

EXAMPLE 12

0.15 Grams of condensate of nonyl phenol and ethylene oxide, 10 grams of sodium metabisulphite and 10 grams of 2-hydroxy-1-naphthaldehyde are charged into 600 mls cold water and the resultant slurry stirred by a high speed mixer for 15 minutes.

A solution of 4.5 grams sodium hydroxide dissolved in 100 mls cold water is added then 1 gram of sodium metabisulphite is added to lower the pH to 8.0. The slurry is stirred at 20°-25° C., pH 8.0 for a further 15 minutes.

To this mixture is added a well dispersed slurry of 6.78 grams of o-phenylenediamine in 100 mls cold water containing 0.075 grams of a condensate of nonyl phenol and ethylene oxide. The slurry is stirred at 20°-25° C. for a further 15 minutes after completion of the addition, and then heated to 70° C. using internal steam heating. A solution of 20.4 grams of nickel nitrate hexahydrate dissolved in 125 mls water containing 26.6 grams 33% ammonia solution (S.G. 0.88) is then added over a period of 5 minutes and the heating is continued until the temperature reaches 98° C. The mixture is held at 98° C. for 30 minutes and then 11 grams 2-hydroxy-1-naphthaldehyde are added over 1-2 minutes. The temperature of the slurry is maintained at 98°-100° C. for 4 hours at which point the pH value is between 4.5 and 5. The slurry is then filtered and the filtercake washed with hot water until free of nickel and sulphite ion, and dried at 50°-55° C.

EXAMPLE 13

The procedure of Example 12 is followed except that 10.0 grams of sodium hydroxide are used in place of 4.5 grams sodium hydroxide to bring the pH to 12.5. The pH is maintained at 12.5 throughout the addition of o-phenylenediamine then allowed to fall as the reaction proceeds to completion. The final pH before filtration is between 8.5 and 9.0.

EXAMPLE 14

0.15 Grams of a condensate of nonyl phenol and ethylene oxide, 10 grams of sodium metabisulphite and 10.9 grams of 2-hydroxy-1-naphthaldehyde are charged into 600 mls cold water and the resultant slurry stirred by a high speed mixer for 15 minutes.

A solution of 6.5 grams potassium hydroxide dissolved in 100 mls cold water is added and the mixture stirred at 20°–25° C. for a further 15 minutes.

To this mixture there is then added a well-dispersed slurry of 6.78 grams of o-phenylenediamine in φmls cold water containing 0.075 grams of a condensate of nonyl phenol and ethylene oxide.

The slurry is stirred at 20°–25° C. for a further 15 minutes after completion of the addition, and then heated to 70° C. using internal steam heating at which stage a solution of 20.4 grams of nickel nitrate hexahydrate dissolved in 125 mls water containing 26.6 grams 33% ammonia solution (S.G. 0.88) is added over a period of 5 minutes.

Heating of the mixture is continued until the temperature reaches 98° C. The mixture is held at 95°–100° C. for 30 minutes and then 11 grams 2-hydroxy-1 -naphthaldehyde as dry powder are added over 1–2 minutes. The temperature of the slurry is maintained at 98°–100° C. for 4 hours at which time the pH value is between 6 and 7. The slurry is then filtered, the filter-cake washed with hot water until free of nickel and sulphite ion and then dried at 50°–55° C.

EXAMPLE 15

The procedure of Example 14 is followed except that 20 grams of 33% ammonia solution (S.G. 0.88) are added instead of 6.5 grams potassium hydroxide and similar results were obtained.

EXAMPLE 16

0.15 Grams of a condensate of nonyl phenol and ethylene oxide, 10 grams of sodium metabisulphite and 10.9 grams of 2-hydroxy-1-naphthaldehyde are charged into 600 mls cold water and the resultant slurry stirred by a high speed mixer for 15 minutes.

A solution of 4.5 grams sodium hydroxide dissolved in 100 mls cold water is added and the total mixture stirred at 20°–25° C. for a further 15 minutes.

To this mixture, there are added 6.78 grams of o-phenylenediamine as a dry powder. The slurry is stirred at 20°–25° C. for a further 15 minutes after completion of the addition, and then heated to 70° C. using internal steam heating at which stage a solution of 20.4 grams of nickel nitrate hexahydrate dissolved in 125 mls water containing 26.6 grams 33% ammonia solution (S.G. 0.88) is added over a period of 5 minutes.

Heating of the mixture is continued until the temperature reaches 98° C. The mixture is held at 95°–100° C. for 30 minutes and then 11 grams of 2-hydroxy-1-naphthatldehyde as dry powder are added over 1–2 minutes. The temperature is maintained at 98°–100° C. for 4 hours at which point the pH lies between 6 and 7. The slurry is then filtered, the filter-cake washed free of nickel and sulphite ion with hot water, and the product dried at 50°–55° C.

EXAMPLE 17

The procedure of Example 16 is followed except that the o-phenylenediamine is added as an acetate solution, the pH being held at 9.0 throughout the addition, with sodium hydroxide solution and similar results were obtained.

EXAMPLE 18

0.15 Grams of a condensate of nonyl phenol and ethylene oxide, 10 grams of sodium metabisulphite and 10.9 grams of 2-hydroxy-1-naphthaldehyde are charged into 600 mls cold water and the resultant slurry stirred by a high speed mixer for 15 minutes.

A solution of 4.5 grams sodium hydroxide dissolved in 100 mls cold water is added and the total mixture stirred at 20°–25° C. for a further 15 minutes.

To this mixture, there is then added a well dispersed slurry of 6.78 grams of o-phenylenediamine in 100 mls cold water containing 0.075 grams of a condensate of nonyl phenol and ethylene oxide. The slurry is stirred at 20°–25° C. for a further 15 minutes after completion of the addition, and then heated to 70° C. using internal steam heating at which point, a solution of 20.0 grams of nickel acetate tetrahydrate dissolved in 125 mls water containing 26.6 grams of 33% ammonia solution (S.G. 0.88) is added over a period of 5 minutes.

Heating of the mixture is continued until the temperature reaches 98° C. The mixture is held at 85°–100° C. for 30 minutes and then 11 grams 2-hydroxy-1-naphthaldehyde as dry powder are added over 1–2 minutes. The temperature of the slurry is maintained at 98°–100° C. for 4 hours at which point the pH value is between 6 and 7. The slurry is then filtered and the filter cake washed with hot water until free of nickel and sulphite ion, and dried at 50°–55° C.

EXAMPLE 19

The procedure of Example 18 is followed except that 20 grams nickel chloride hexahydrate are substituted for 20 grams nickel acetate tetrahydrate and similar results were obtained.

EXAMPLE 20

The procedure of Example 18 is followed except that 20.4 grams of nickel nitrate hexahydrate are substituted for nickel acetate tetrahydrate and the 26.6 grams ammonia solution are added to the ligand slurry before metallisation instead of to the nickel solution and similar results were obtained.

EXAMPLE 21

The procedure of Example 20 is followed except that the ammonia solution is omitted entirely.

EXAMPLE 22

0.15 Grams of a condensate of nonyl phenol and ethylene oxide, 10 grams of sodium metabisulphite and 10.9 grams of 2-hydroxy-1-naphthaldehyde are charged into 600 mls cold water and the resultant slurry stirred by a high speed mixer for 15 minutes.

A solution of 4.5 grams sodium hydroxide dissolved in 100 mls cold water is added and the total mixture stirred at 20°–25° C. for a further 15 minutes.

To this mixture there is then added a well dispersed slurry of 6.78 grams of o-phenylenediamine in 100 mls cold water containing 0.075 grams of a condensate of nonyl phenol and ethylene oxide. The slurry is stirred at 20°–25° C. for a further 15 minutes after completion of the addition, and then heated to 40° C. using internal steam heating, at which point a solution of 20.4 grams of nickel nitrate hexahydrate dissolved in 125 mls water containing 26.6 grams 33% ammonia solution (S.G. 0.88) is added over a period of 5 minutes.

Heating of the mixture is continued until the temperature reaches 98° C. The mixture is held at 95°–100° C. for 30 minutes and then 11 grams 2-hydroxy-1-naphthaldehyde as dry powder are added over 1–2 minutes. The temperature of the slurry is maintained at 98°–100° C. for 4 hours at which point the pH value is between 6 and 7. The slurry is then filtered and the filter cake washed with hot water until free of nickel and sulphite ion, and dried at 50°–55° C.

EXAMPLE 23

The procedure of Example 22 is followed except that the metallising solution is added to the ligand slurry which is at 50° C. and similar results were obtained.

EXAMPLE 24

The procedure of Example 22 is followed except that the temperature at which the metallising solution is added is 95° C. and similar results were obtained.

EXAMPLE 25

The procedure of Example 22 is followed except that the temperature at which the metallising solution is added is 70° C. and the slurry is held at 95° C. for 2 hours before the second addition of 2-hydroxy-1-naphthaldehyde and similar results were obtained.

EXAMPLE 26

16 Parts of product of Example 1 are mixed with 5 parts anhydrous sodium acetate and 29 parts anhydrous sodium chloride and ground in a ball mill containing steel balls for 1 hour. The pigment salt mixture is discharged from the ball mill and stirred with 3,000 parts of water at 50° C. for 1 hour then filtered, washed salt free and dried at 50°–55° C.

The resultant product, when tested according to the procedure outlined in Example 27 versus the unground material, is found to exhibit improved transparency and to have a yellower hue.

EXAMPLE 27

9.0 Parts of the product of Example 1 are ball milled for 40 hours with 22.5 parts of a 60% solution of hydroxy acrylic resin in a 1:1 mixture of xylene and n-butanol, sold under the trade mark "Dynocryl H-225XB" and 58.5 parts xylene. To this are added a further 30 parts of "Dynocryl H-225XB" and 75 parts xylene, and the mixture milled for a further 30 minutes. 22.5 Parts of a 60% solution of unmodified isobutylated melamine formaldehyde in iso-butanol, sold under the trade mark "Dynomin M1-11" are then added and the milling continued for a further 15 minutes. The resulting paint has a pigment to binder ratio of 1:5. This is adjusted to 1:9.16 with further resin solution and the paint thinned to the required viscosity for spraying. Aluminium panels are sprayed with this lacquer then stoved at 120° C. for 30 minutes. The resulting orange red paint films have excellent fastness to light, heat and acids.

EXAMPLE 28

10.0 Parts of the product of Example 1 are ball milled for 16 hours with 20.0 parts of a 60% solution of glycerol coconut-oil alkyd in xylene, sold under the trade mark "Beetle BA99/5," and 50 parts of a 4:1 mixture of xylene and n-butanol.

After this time, a further 64 parts of Beetle BA99/5 are added and the milling continued fo 30 minutes. 26 parts of a 60% solution of unmodified isobutylated melamine formaldehyde resin in xylene/iso-butanol sold under the trade mark "Epok U9192" are then added and the mixture milled for a further 15 minutes. The resultant paint has a pigment to binder ration of 1:6.6. The paint is thinned to the required viscosity for spraying and aluminium panels are sprayed with this lacquer. After allowing 15 minutes to flash off, the panels are stored at 120° C. for 30 minutes. The resulting orange red paint films have excellent fastness to light, heat and acids.

EXAMPLE 29

1 Part of product from Example 1 and 5 parts of titanium dioxide, sold under the trade mark "Kronos RN56," are dispersed with 200 parts of high density polyethylene, sold under the trade mark "Shell Grade 50/120 MB" by milling at 150/110° C. on a two roll mill.

The mixture is removed from the mill, allowed to cool, then replaced on the mill and the rest of the polymer added as quickly as possible. Milling is continued for 10 minutes after all the polymer has been added and the "hide" is removed from the mill at a thickness of 3.5 mm. The hide is chipped into small pieces and fed to an injection moulding machine. The resultant orange red mouldings have excellent light and heat stability.

What I claim is:

1. A process for the production of a compound having the formula

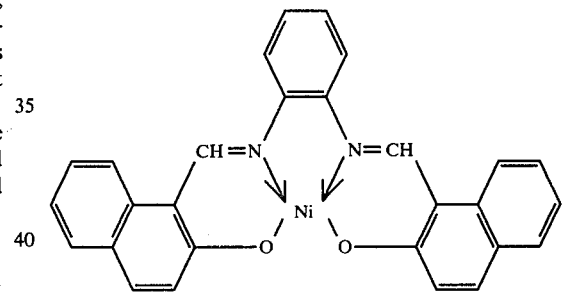

I in the pigmentary form in which it has an orange red colour and has an x chromaticity coordinate of from 0.59 to 0.63 and a y chromaticity coordinate of from 0.33 to 0.36, which process comprises:

(a) forming a suspension of 2-hydroxy-1-naphthaldehyde in an alkaline medium in the presence of an antioxidant, (b) reacting this suspension with the stoichiometric proportion of o-phenylene diamine required to form the compound having the formula

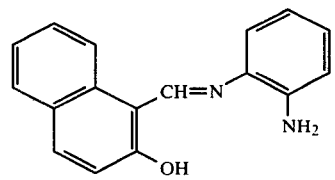

II (c) metallising the compound of formula II with a solution of a nickel salt (d) reacting the metallised compound of formula II with the stoichiometric proportion of 2-hydroxy-1-naphthaldehyde required to form the compound of formula I and (e) isolating the compound of formula I.

2. A process as claimed in claim 1 wherein the antioxidant present is an alkali metal metabisulphite.

3. A process as claimed in claim 1 wherein the proportion of antioxidant added in step (a) is up to 200% by weight, relative to the 2-hydroxy-1-naphthaldehyde.

4. A process as claimed in claim 1 wherein, in step (a), the initial pH value, after the addition of the alkali, is in the range of from 8.0 to 12.5 and this reaction stage is effected at a temperature in the range of from 20° to 25° C.

5. A process as claimed in claim 1 wherein, in step (b), the ortho-phenylenediamine is added as dry powder, aqueous slurry or solution.

6. A process as claimed in claim 1 wherein the reaction in step (b) is effected at a pH value in the range 8.0 to 12.5 and the temperature is allowed torise to 40° to 100° C.

7. A process as claimed in claim 6 wherein the temperature is allowed to rise to 50° to 75° C.

8. A process as claimed in claim 1 wherein the metallisation step (c) is effected at a pH value within the range of form 8.0 to 12.5 and, after the addition of all the metallising agent, the pH is within the range of from 7.5 to 10.0.

9. A process as claimed in claim 1 wherein the metallisation step (c) is effected at a temperature up to 100° C.

10. A process as claimed in claim 9 wherein the temperature is within the range of from 50° to 75° C.

11. A process as claimed in claim 1 wherein the final reaction mixture of step (c) is held at 70°–100° C., for up to 2 hours.

12. A process as claimed in claim 1 wherein the aldehyde is added as a powder or an aqueous slurry, in condensation step (d).

13. A process as claimed in claim 1 wherein the condensation step is effected at 95°–100° C. and the reaction mixture is held at this temperature until the pH of the mixture drops to a value within the range of from 6.0 to 7.0.

14. A process as claimed in claim 1 wherein ammonium ions are present during the metallisation step (c).

15. A process as claimed in claim 1 wherein the nickel salt used in step (c) is a nickel ammonium complex of an inorganic or organic acid.

16. A process as claimed in claim 1 wherein the process is effected with mechanical stirring and in the presence of a non-ionic surface-active agent which does not interfere with the reaction sequence.

* * * * *